UNITED STATES PATENT OFFICE.

WILLIAM J. BURNS, OF BRIDGEPORT, CONNECTICUT, ASSIGNOR TO THE PEERLESS VULCANITE COMPANY, OF BRIDGEPORT, CONNECTICUT, A CORPORATION OF CONNECTICUT.

METHOD OF MAKING PLASTIC ARTICLES.

1,304,851.  Specification of Letters Patent.  Patented May 27, 1919.

No Drawing.  Application filed August 2, 1916.  Serial No. 112,848.

*To all whom it may concern:*

Be it known that I, WILLIAM J. BURNS, a citizen of the United States, residing at Bridgeport, county of Fairfield, State of Connecticut, have invented an Improvement in Methods of Making Plastic Articles, of which the following is a specification.

This invention has for its object to provide a novel method of making articles, as buttons, pool balls, talking-machine records, insulating blocks, etc., from plastic material.

In the production of articles from plastic material, it has heretofore been customary to heat the dies and the composition, then to place the composition in the dies, and then subject the dies with the composition therein to the action of a water-cooled press. The operation is slow and, for that and other reasons, not entirely satisfactory. It is necessary to allow the press to remain closed with the power on until the composition in the dies becomes sufficiently set or chilled to permit removal of the article therefrom. The suddenness of the cooling operation not infrequently causes the composition to set in the dies before the article is wholly shaped by the pressing operation, which may cause the articles to come out spotted, porous, and defective in various ways, and on the other hand it not infrequently happens that in the haste of production articles are removed from the dies before becoming entirely set, and as a result of their being taken out too hot will warp and twist and thus become defective if not ruined. My present method of making articles entirely overcomes both of these objections, and enables the articles to be produced very much more rapidly and economically than has heretofore been possible and practically insures the production of perfect articles.

The invention consists in subjecting the composition while in dies to one or more pressing and heating operations, followed by one or more independent pressing and cooling operations. I thus insure the perfect formation of the articles by pressure and heat combined before the cooling operation commences, save time by doing so and avoid loss from imperfect articles. Either steam, hydraulic, or mechanically operated presses may be used, the style of press being wholly unimportant so far as the principle of the invention is concerned, the essential feature of which is that the material while in dies is subjected to one or more pressing operations under heat to complete the formation of the article and is then, without being removed from the dies, subjected to one or more pressing and cooling operations. In other words, the platens of one or more presses are heated by steam or in any suitable manner, the platens of one or more presses, contiguous to the heated presses, are cooled by water or in any suitable manner, and the material in the dies, any number of which may be used, is subjected to the action of the presses successively. The number of presses used is unimportant so far as the principle of the invention is concerned and it is likewise unimportant how the dies with the material therein are shifted from one press to another. It may be done by hand, but the operation is preferably performed by a suitable mechanical conveyer. Enough dies are of course used to enable the operation to be made continuous, no article being removed from the dies until completely set and cooled.

Having thus described my invention, I claim:—

The method of making plastic articles which consists in subjecting a plastic composition while in a die to successive pressing operations under heat until wholly shaped to the desired contour, and then subjecting the shaped article while in the same die to successive pressing operations under the influence of a cooling medium until the article is sufficiently cooled to permit removal thereof.

In testimony whereof I affix my signature.

WILLIAM J. BURNS.